United States Patent
Glaser

(10) Patent No.: US 8,439,393 B2
(45) Date of Patent: May 14, 2013

(54) ATTACHMENT DEVICE

(75) Inventor: Carsten Glaser, Muehltal (DE)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 13/082,069

(22) Filed: Apr. 7, 2011

(65) Prior Publication Data
US 2011/0248480 A1    Oct. 13, 2011

(30) Foreign Application Priority Data

Apr. 7, 2010 (DE) .......................... 10 2010 014 051

(51) Int. Cl.
*B60R 21/20* (2011.01)
*B60R 21/213* (2011.01)

(52) U.S. Cl.
USPC .................................... 280/728.2; 280/730.2

(58) Field of Classification Search ............... 280/728.2, 280/730.2, 730.1; 296/1.08, 39.1, 193.06; 411/508, 411/999; 24/297, 453, 457, 458, 464, 532, 24/531, 545, 602, 573.09, 465, 466, 468, 24/478, 712.9, 460, 461, 462, 30.5 R, 67 R, 24/67.7; 248/74.1, 74.4
See application file for complete search history.

(56) References Cited

U.S. PATENT DOCUMENTS

| | | | |
|---|---|---|---|
| 5,398,960 A * | 3/1995 | Ravenberg et al. ........ | 280/728.3 |
| 5,496,060 A * | 3/1996 | Whited et al. ............ | 280/728.3 |
| 5,520,410 A | 5/1996 | Sun | |
| 5,651,562 A * | 7/1997 | Hagen et al. ............... | 280/728.3 |
| 5,676,393 A * | 10/1997 | Rose .......................... | 280/728.3 |
| 6,402,188 B1 * | 6/2002 | Pasch ......................... | 280/728.2 |
| 6,431,584 B1 * | 8/2002 | Nagasawa et al. ......... | 280/728.2 |
| 6,431,585 B1 | 8/2002 | Rickabus et al. | |
| 6,863,300 B2 * | 3/2005 | Ryu ........................... | 280/730.2 |
| 7,338,068 B2 | 3/2008 | Kawai et al. | |
| 7,454,826 B2 | 11/2008 | Nessel et al. | |
| 7,523,958 B2 * | 4/2009 | Jang et al. .................. | 280/730.2 |
| 7,549,670 B2 * | 6/2009 | Breuninger .................. | 280/729 |

(Continued)

FOREIGN PATENT DOCUMENTS

| DE | 19838069 A1 | 3/2000 |
|---|---|---|
| DE | 102007033743 A1 | 4/2009 |
| WO | 2009039276 A1 | 3/2009 |

OTHER PUBLICATIONS

German Patent Office, Search Report for German Application No. 102010014051.1, dated Feb. 28, 2011.

(Continued)

*Primary Examiner* — Joseph Rocca
(74) *Attorney, Agent, or Firm* — Ingrassia Fisher & Lorenz, P.C.

(57) ABSTRACT

An attachment device is provided for securing a cladding element covering an airbag to a motor vehicle body. The airbag is designed to deploy during and/or after activation of the airbag, predominantly in a main direction of force exertion, encompassing a mount that is attachable or attached to the motor vehicle body in an assembly direction, and an insert that is attachable or attached to the cladding element. The insert is connectable or connected with the mount by means of a first connection device and the attachment device is designed to open in an opening direction during and/or after activation of the airbag by releasing the first connection device. The opening direction coincides with and/or mirrors the main direction of force exertion.

19 Claims, 2 Drawing Sheets

U.S. PATENT DOCUMENTS

| | | |
|---|---|---|
| 7,621,556 B2 | 11/2009 | Itakura |
| 7,665,760 B2 | 2/2010 | Lee |
| 7,717,458 B2 | 5/2010 | Tsuge |
| 7,878,530 B2 | 2/2011 | Mizuno et al. |
| 7,909,357 B2 | 3/2011 | Iida et al. |
| 2004/0094938 A1* | 5/2004 | Ryu .......................... 280/730.2 |
| 2007/0296188 A1* | 12/2007 | Breuninger ............... 280/730.2 |
| 2009/0302583 A1 | 12/2009 | Stepan |

OTHER PUBLICATIONS

British Patent Office, Search Report for British Application No. GB1102225.8, dated Jun. 1, 2011.

* cited by examiner

ATTACHMENT DEVICE

CROSS-REFERENCE TO RELATED APPLICATION

This application claims priority to German Patent Application No. 102010014051.1, filed Apr. 7, 2010, which is incorporated herein by reference in its entirety.

TECHNICAL FIELD

The technical field relates to an attachment device for attaching an airbag-covering cladding element to a motor vehicle body.

BACKGROUND

A device for mounting a column cladding component in motor vehicles is known from DE 198 38 069 A1. The device encompasses a retaining bolt anchored in a motor vehicle column, which is joined via coupling means with a thrust bearing secured to the column cladding component. The coupling means hold the cladding component in a desired position on the motor vehicle column, and release it during the deployment of a side airbag. A safety belt secured to the thrust bearing and retaining bolt holds the cladding component in place on the motor vehicle column after its release.

Document U.S. Pat. No. 7,338,068 B2 discloses a retaining clip for attaching a cladding section to a vehicle skeleton. The retaining clip has an attachment device for securing the retaining clip to the vehicle skeleton, and a connection device for joining the retaining clip with the cladding section. The attachment device and connection device are joined together by a u-shaped bracket and snap connection. When an airbag arranged under the cladding section is activated, the snap connection is released, opening the retaining clip. The u-shaped bracket holds the cladding section against the vehicle skeleton, thereby preventing the cladding section from moving toward a vehicle passenger compartment.

At least one object is to improve the way in which an attachment device opens, and the attachment device is designed to secure an airbag-covering cladding element to a motor vehicle body. In addition, other objects, desirable features and characteristics will become apparent from the subsequent detailed description, and the appended claims, taken in conjunction with the accompanying drawings and this background.

SUMMARY

An attachment device is provided for securing an airbag-covering cladding element to a motor vehicle body. In particular, the airbag is arranged between a motor vehicle column or a roof frame and the cladding element. In particular, the cladding element is designed as a column or a section of a vehicle roof in a motor vehicle, e.g., an automobile. The cladding element is designed to hide the airbag or motor vehicle body from the view of the vehicle passengers, thereby ensuring the design and/or aesthetic aspects in a motor vehicle passenger compartment, among other things.

The airbag is designed to deploy during and/or after activation of the airbag, with the force acting primarily in one main direction. The force preferably acts in the main direction in which the airbag primarily deploys and/or inflates. In particular, the main direction of force exertion is the direction toward a location in the motor vehicle where the airbag is situated in when completely blown up or inflated, and/or where it assumes a protective function relative to the vehicle passengers given a collision of the motor vehicle. The main direction of force exertion is especially the direction in which a gas generated by a gas generator predominantly flows at the beginning of the airbag deployment process, or in which the gas in the airbag is primarily guided. For a head airbag designed as a so-called "curtain airbag" or "rooval airbag", the main direction of force exertion moves from the roof frame toward the vehicle floor, for example, while the main direction of force exertion runs parallel to a traveling direction of the motor vehicle for a side airbag, for example.

The attachment device encompasses a mount, which is attachable or attached to the motor vehicle body in one assembly direction. The mount is preferably connectable or connected in a positive or non-positive manner with the motor vehicle body via one or more attachment means. For example, the attachment means can be designed as a screw, bolt or rivet. Also conceivable is a clamping strap or clip, which is inserted into the motor vehicle body, and expands after inserted. The attachment means is secured against slipping out of the motor vehicle body, and can ensure a reliable, durable connection between the mount and motor vehicle body.

In particular, the assembly direction is the direction in which the mount is secured and/or assembled to the motor vehicle body. In particular, the assembly direction is the direction in which the attachment means is/are introduced or inserted into the motor vehicle body.

The mount is usually designed to be mounted perpendicularly or essentially perpendicularly on the motor vehicle body. In particular, the mount is secured to the motor vehicle body at an angle of preferably at least approximately 45 degrees, in particular at least approximately 75 degrees, and preferably up to approximately 105 degrees, especially up to approximately 135 degrees.

The attachment device has an insert that is attachable and/or attached to the cladding element. The insert is preferably joined permanently with the cladding element. In particular, the inert cannot be detached from the cladding element without being damaged or destroyed.

The insert is connectable or connected with the mount by means of a first connection device. The first connection device is here preferably detachable in design. In particular, the mount and insert form a joined unit in the connected state, which can be separated by detaching the first connection device.

The attachment device is designed to open in an opening direction when the airbag is activated by releasing the first connection device. The joined unit between the mount and insert is preferably separated into two components via the opening of the attachment device. In particular, the opening direction is the direction in which the first connection device is detached and/or in which the insert moves away from the mount, e.g., upon sliding out and/or decoupling. The opening direction preferably does not coincide with the assembly direction and/or the opening direction does not mirror the assembly direction.

The opening direction coincides with and/or mirrors the main direction of force exertion. The opening direction is preferably directed at an angle of up to approximately ±55 degrees, in particular of up to approximately ±35 degrees, especially of up to approximately ±25 relative to the main direction of force exertion One advantage is that the attachment device is designed to open in the direction of the main direction of force exertion during and/or after activation of the airbag. The attachment device is advantageously easier to open than conventional attachment devices, since as opposed to the present invention, the attachment devices described in cited prior art do not open in the main direction in which the airbag exerts its force, but rather in the direction opposite the assembly direction.

Another advantage is that the resistance encountered during the detachment of the first connection device can be overcome more rapidly and effectively by virtue of the fact that the main direction of force exertion largely or entirely coincides with the opening direction of the attachment device. The inflating airbag is prevented from deploying by the cladding element for a shortened period of time. Because the attachment device opens quickly, the airbag can exit the cladding element faster, and hence exert its protective effect relative to the vehicle passengers even more effectively.

In one possible embodiment, the airbag is designed as a side airbag or head airbag. In particular, the head airbag can be designed as a so-called "rooval airbag" or "curtain airbag". When activated, the airbag preferably protects the vehicle passengers against injury, in particular to the head and/or upper body, which can be caused by a side impact or rollover by the motor vehicle, in that the airbag absorbs the impact of the vehicle passenger against the vehicle or window side of the motor vehicle.

In one preferred embodiment, the opening direction is directed at an included angle of preferably at least approximately 45 degrees, in particular at least approximately 75 degrees, especially at least approximately 90 degrees relative to the assembly direction. It is especially preferred that the opening direction be directed perpendicularly relative to the assembly direction. In particular, an angle of deviation between the assembly and opening direction is not to exceed approximately 135 degrees.

In an especially preferred embodiment of the invention, the main direction of force exertion is directed at an included angle of preferably at least approximately 45 degrees, in particular at least approximately 75 degrees, especially at least approximately 90 degrees relative to the assembly direction. It is especially preferred that the main direction of force exertion be directed perpendicularly relative to the assembly direction. In particular, an angle of deviation between the assembly and main force exertion direction is not to exceed approximately 135 degrees.

In one embodiment, the mount is rectangular or square in design in a sectional view perpendicular to the longitudinal extension of the airbag in the non-activated state. A round or oval shape is also conceivable. The mount can also be designed as a hollow body, wherein the lateral surfaces can essentially be formed by rectangles, squares, circles, etc. Other suitable shapes are also conceivable as an option. In particular, the mount has an opening that at least partially forms a receptacle for the first connection device.

In particular, the insert has an angular shape and/or an L-shape in the sectional view perpendicular to the longitudinal extension of the airbag in the non-activated state. If the mount is round or oval, the insert is preferably C-shaped. The insert is usually adjusted to the outer dimensions and/or shape of the mount. The insert preferably has a first and a second leg, wherein the first leg is connected with the mount via the first connection device, and the second leg is connected with the cladding element.

In an embodiment, the insert is permanently attached to the cladding element. The second leg is usually positively or non-positively joined with the cladding element. For example, it can be attached to the cladding element by means of a clip, snap or hook connection. A screw or rivet connection between the second leg and the cladding element is also conceivable. A bonded connection between the cladding element and the second leg is possible as well, wherein the second leg can be gated, welded or adhesively bonded to the cladding element. The second leg of the insert is preferably connected with the cladding element in such a way that the activation of the airbag does not cause it to become detached from the cladding element.

In an embodiment, the insert is designed to be pushed into a groove arranged on the cladding element. The second leg preferably has two hooks, which are pushed into an attachment dome that is arranged on the cladding element and exhibits the groove.

In particular, the attachment between the insert and cladding element has a height that coincides with and/or mirrors the connection between the receptacle and the motor vehicle body. In particular, the attachment between the insert and cladding element is situated perpendicular to the main force exertion and/or opening direction.

The first connection device is preferably designed to non-positively and/or positively join the insert with the mount. In particular, the first connection device is designed to be inserted into the receptacle of the mount and snapped in, which normally ends up joining the mount and insert to form a single unit. For example, the first connection device is situated on the first leg of the insert.

In one embodiment, the first connection device is designed as a detachable clip or snap connection. The detachable clip or snap connection preferably allows the attachment device to open during and/or after activation of the airbag.

It is especially preferred that the connection device be designed to be detached from a cladding element in response to a compressive force relayed to the insert, wherein the compressive force is generated by a gas generated by a gas generator during and/or after activation of the airbag, and acts on the cladding element when the airbag impacts the latter. It is also conceivable for a strap retainer of the airbag to impact the cladding element during and/or after activation, and convey the compressive force to the latter.

In particular, the airbag deploys suddenly during and/or after activation in the main direction of force exertion, and pushes against the cladding element, pressing it in the main direction of force exertion. This pressure exerted by the expanding airbag preferably exposes the cladding element to the compressive force, which is transferred to the insert and first connection device, in particular via the permanent and/or undetachable connection between the insert and the cladding element. The first connection device preferably snaps out of the insert of the mount, as a result of which the insert moves in a main force exertion and/or opening direction, and the attachment device opens.

In another possible embodiment, the insert is joined with the mount by a second connection device. The second connection device is preferably arranged on the second leg of the insert. In particular, the second connection device is designed as a connection piece and/or a coupling means. The connection piece and/or coupling means generally permits a limiting spacing between the mount and insert of preferably up to approximately 30 cm, in particular of up to approximately 20 cm, especially of up to approximately 10 cm. The second connection device designed as a connection piece and/or coupling means preferably prevents a complete removal or decoupling of the mount from the insert.

In particular, the second connection device is designed to firmly bond the mount with the insert. In particular, the second connection device is gated, welded or adhesively bonded to the mount and/or the insert. An optional non-positive or positive connection is also conceivable, e.g., a screwed, riveted or clamped connection between the second connection device and the insert and/or the mount.

In an embodiment, the second connection device is designed as a flexible strap or clamping strap. The second connection device is preferably designed to retain the insert and/or cladding element against the mount after the attachment device has opened, and prevent the insert and/or cladding element from being slung away toward a motor vehicle passenger compartment. In particular, the permanent, undetachable connection between the insert and cladding element ensures the retention of the insert and/or cladding element.

Another embodiment relates to an airbag arrangement with an airbag, a cladding element and an attachment device according to the previous description.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
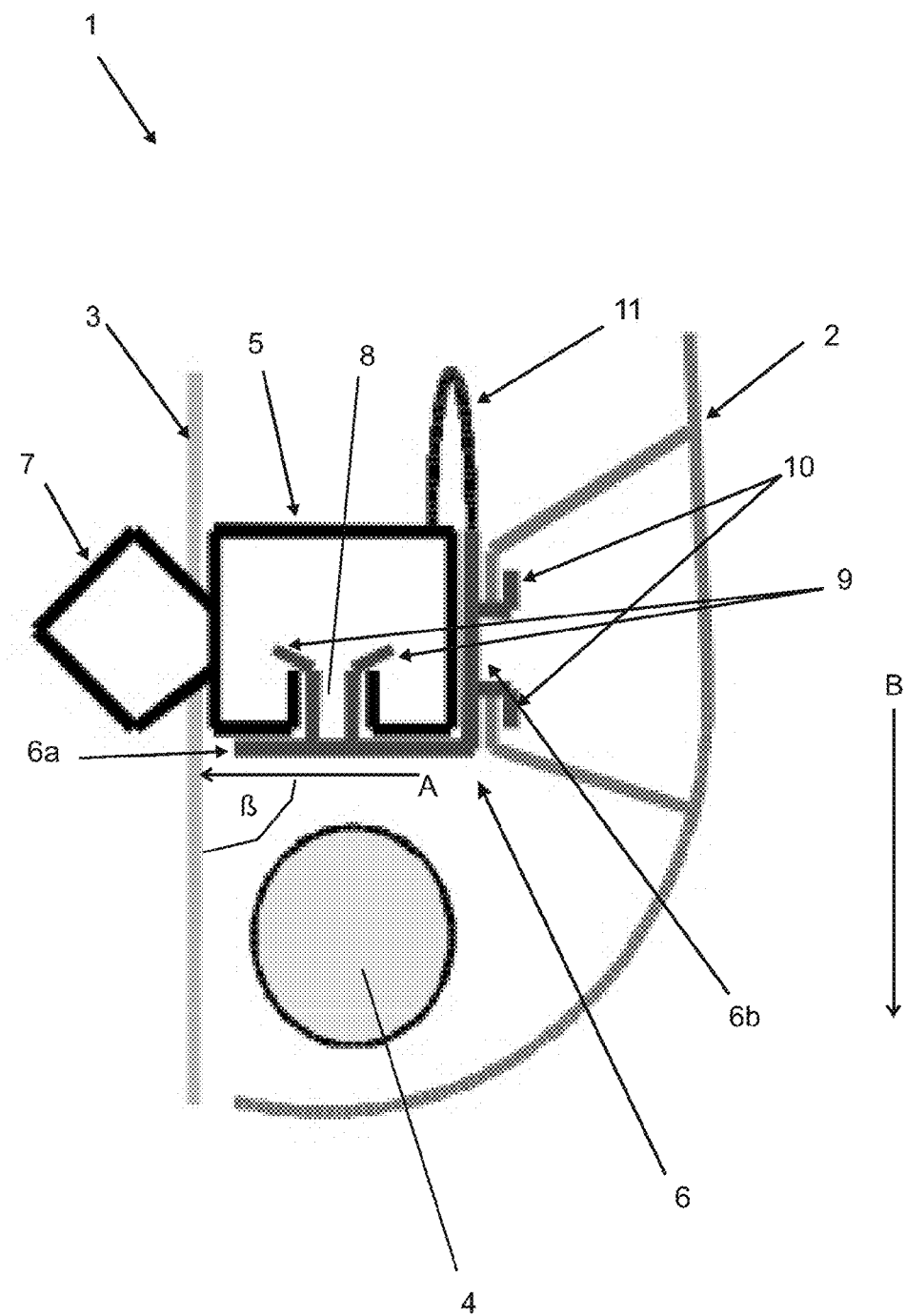
FIG. 1 is a section through an attachment device in the closed state.

FIG. 1 shows one exemplary embodiment. FIG. 1 shows a section through an attachment device 1 in a closed state. The section extends perpendicular to the longitudinal extension of an airbag in a non-activated state. The attachment device 1 is designed to secure a cladding element 2 to a motor vehicle column 3 of an automobile.

An airbag 4 is arranged between the motor vehicle column 3 and the cladding element 2. The cladding element 2 covers an airbag 4 and the motor vehicle column 3 toward a vehicle passenger compartment. The airbag 4 is designed as a side airbag, and deploys during and/or after an activation, e.g., caused by an automobile accident, toward a vehicle passenger located in the vehicle passenger compartment, parallel to the traveling direction.

The attachment device 1 encompasses a mount 5 and an insert 6. In a sectional view, the mount 5 resembles a rectangle with an opening on a lateral surface. The mount 5 is permanently and positively joined with the motor vehicle column 3 by means of a clamping strap 7 in an assembly direction A. The mount 5 is secured to the motor vehicle column 3 perpendicularly, at an angle $\beta$=approximately 90 degrees.

In the sectional view, the insert 6 is L-shaped, and its shape and dimensions are adjusted to the mount 5. The insert 6 has a first leg 6a and a second leg 6b, the insides of which flatly abut the mount. The first leg 6a accommodates a first connection device, which is designed as a snap connection.

The opening on the mount 5 forms a receptacle 8 for the first connection device 9. As a result of the first connection device 9, the insert 6 is detachably joined with the mount 5. The second leg 6b accommodates a connection 10 designed to securely join the insert 6 with the cladding element 2. The second leg 6b has a second connection device 11, which is designed as a flexible strap, and establishes a permanent connection between the mount 5 and the insert 6. The strap is gated onto the second leg 6b. The strap is joined with the mount 5 by means of a screwed connection, for example.

Figure 2:
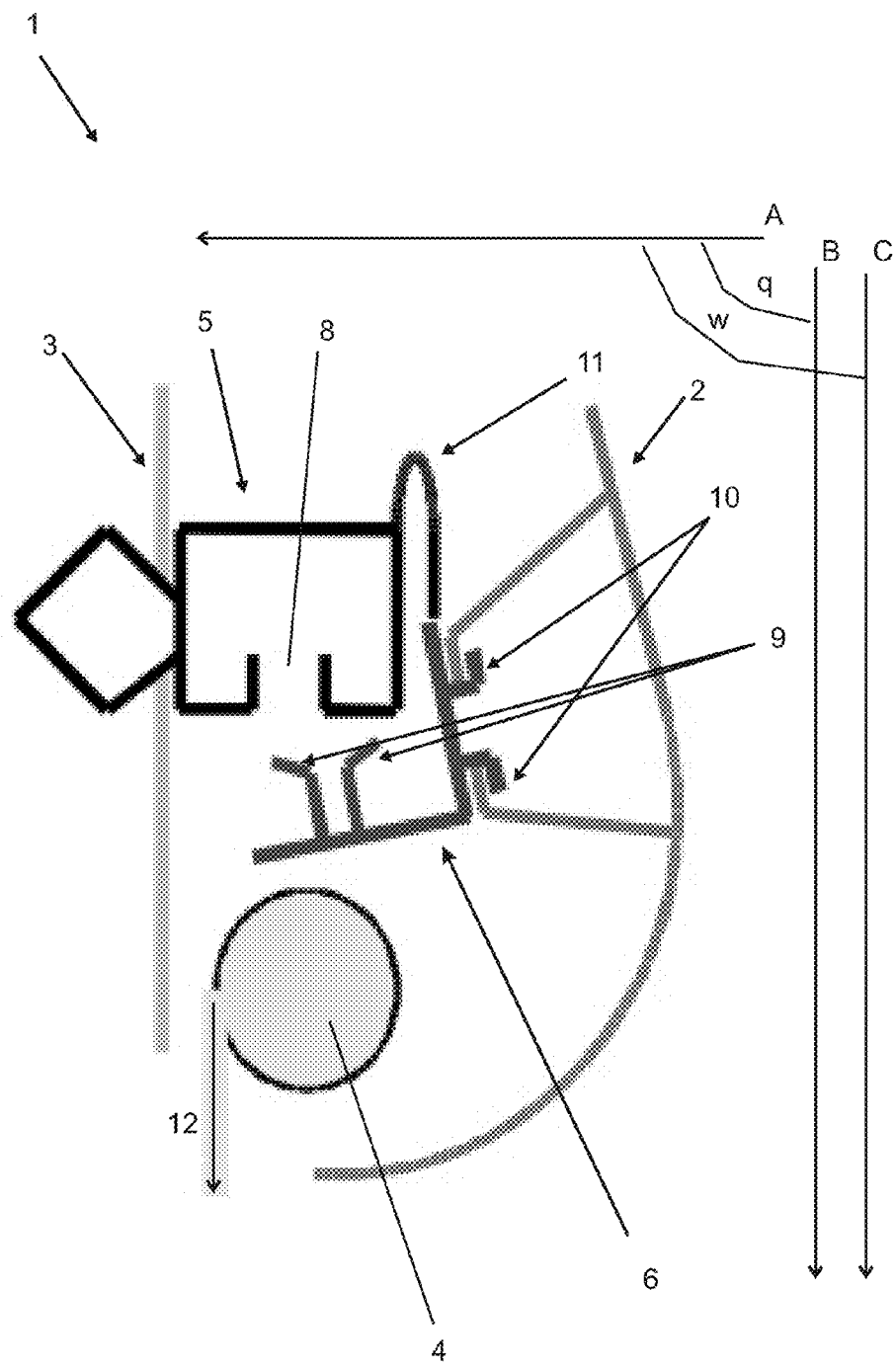
FIG. 2 is a section through the attachment device from FIG. 1 in the open state.

FIG. 2 shows the section through the attachment device 1 from FIG. 1 in an opened state, wherein corresponding or identical parts on the figures are each provided with the same reference numbers. The attachment device 1 is designed to be opened during and/or after activation of the airbag 4 via the release of the first connection device 9 in an opening direction B. During the process of opening, the opening direction B is directed perpendicularly or at an angle of q=of the invention 90 degrees relative to the assembly direction A.

During and/or after activation of the airbag 4, the airbag 4 expands in a main direction of force exertion C. The main direction of force exertion C is the direction in which the airbag 4 is deployed the fastest and/or with the greatest compressive force 12 in response to a gas generated by a gas generator. The main direction of force exertion C coincides with the opening direction B, and/or is identically oriented relative to the latter. The main direction of force exertion C is perpendicularly directed, at an angle w=of the invention 90 degrees, relative to assembly direction A.

The airbag 4 impacts the cladding element 2 with the compressive force 12 in the main direction of force exertion C, as a result of which the compressive force 12 acts on the cladding element 2. The rigid connection 10 between the insert 6 and cladding element 2 causes the compressive force 12 to be conveyed from the cladding element 2 to the insert 6, as a result of which the first connection device 9 detaches, and the insert 6 slips out of the receptacle 8 in the main direction of force exertion and opening direction C; B.

As the attachment device 1 opens, the insert 6 and cladding element 2 are moved by the compressive force 12 in the main direction of force exertion and opening direction C; B. The second connection device 11 is designed to retain the insert 6 and cladding element 2 against the mount 5, and prevent the insert 6 and cladding element 2 from being uncontrollably slung into the vehicle passenger compartment.

Designing the second connection device 11 as a flexible strap allows the cladding element 2 to pivot from the motor vehicle column 3 in a direction opposite the assembly direction A. As a result, the cladding element 2 can make enough room for the airbag to deploy along the motor vehicle column 3 toward the vehicle passengers. The direction toward the vehicle passengers essentially corresponds to the main direction of force exertion C and/or mirrors the latter.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An attachment device for securing a cladding element covering an airbag to a motor vehicle body, the airbag configured to deploy predominantly in a main direction of a force exertion, comprising:

a mount that is configured to attach to the motor vehicle body in an assembly direction;

an insert that is configured to attach to the cladding element; and a first connection device configured to connect the insert with the mount;

wherein the attachment device is configured to open in an opening direction by releasing the first connection device;

wherein the opening direction coincides with a main direction of force exertion; and wherein the insert is attached to the cladding element; and wherein the connection between the insert and cladding is configured to cause the force from airbag deployment to be conveyed from the cladding element to the first connection device via the insert, releasing the first connection device predominantly in the opening direction.

2. The attachment device according to claim 1, wherein the airbag is a side airbag.

3. The attachment device according to claim 1, wherein the airbag is a head airbag.

4. The attachment device according to claim 1, wherein the opening direction is directed at a closed angle at least approximately 45 degrees relative to the assembly direction.

5. The attachment device according to claim 1, wherein the opening direction is directed at a closed angle at least approximately 75 degrees relative to the assembly direction.

6. The attachment device according to claim 1, wherein the opening direction is directed at a closed angle at least approximately 90 degrees relative to the assembly direction.

7. The attachment device according to claim 1, wherein the main direction of force exertion is directed at an included angle of at least approximately 45 degrees relative to the assembly direction.

8. The attachment device according to claim 1, wherein the main direction of force exertion is directed at an included angle of at least approximately 75 degrees relative to the assembly direction.

9. The attachment device according to claim 1, wherein the main direction of force exertion is directed at an included angle of at least approximately 90 degrees relative to the assembly direction.

10. The attachment device according to claim 1,
wherein the mount is rectangular in a sectional view perpendicular to a longitudinal extension of the airbag in a non-activated state, and
wherein the insert has an angular shape in the sectional view perpendicular to the longitudinal extension of the airbag in the non-activated state.

11. The attachment device according to claim 1, wherein the insert is configured to be pushed into a groove arranged on the cladding element.

12. The attachment device according to claim 1, wherein the first connection device is designed to removably join the insert with the mount.

13. The attachment device according to claim 1, wherein the first connection device is a detachable clip.

14. The attachment device according to claim 1, wherein the first connection device is a snap connection.

15. An attachment device for securing a cladding element covering an airbag to a motor vehicle body, the airbag configured to deploy predominantly in a main direction of a force exertion, comprising:

a mount that is configured to attach to the motor vehicle body in an assembly direction;

an insert that is configured to attach to the cladding element; and a first connection device configured to connect the insert with the mount;

wherein the attachment device is configured to open in an opening direction by releasing the first connection device, and wherein the opening direction coincides with a main direction of force exertion;

wherein the first connection device is configured to detach via a compressive force conveyed from the cladding element to the insert; and wherein the compressive force is generated by a gas generator and acts on the cladding element when the airbag impacts.

16. The attachment device according to claim 15, wherein the insert is joined with the mount with a second connection device.

17. The attachment device according to claim 16, wherein the second connection device firmly bonds the mount with the insert.

18. The attachment device according to claim 16, wherein the second connection device is a flexible strap.

19. The attachment device according to claim 16, wherein the second connection device is a clamping strap.

* * * * *